2,088,248

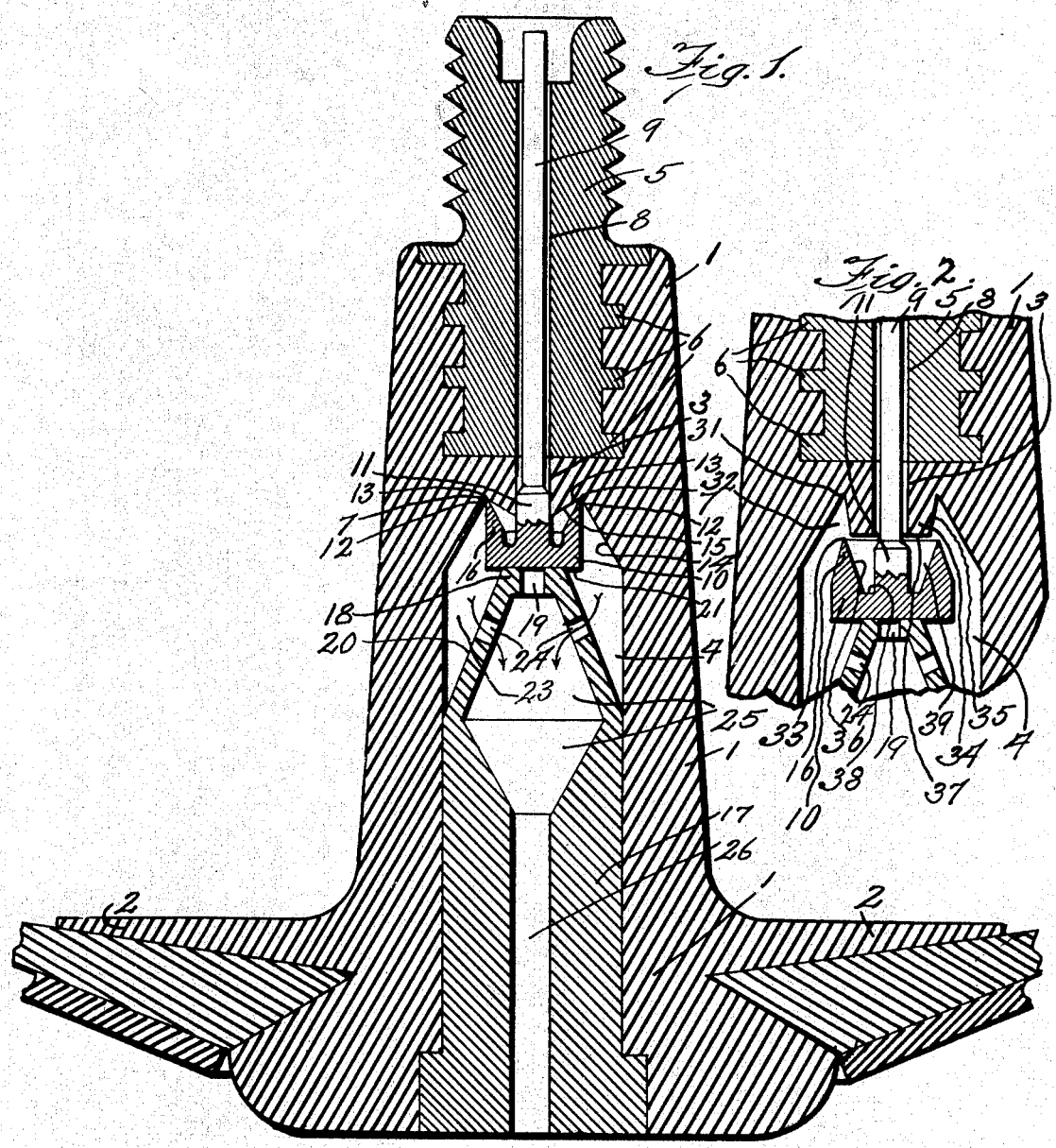
July 27, 1937.     I. D. PERRY     2,088,248
AIR VALVE AND THE LIKE
Filed Sept. 14, 1935
Inventor:
Ira D. Perry Patented July 27, 1937

UNITED STATES PATENT OFFICE 2,088,248

AIR VALVE AND THE LIKE

Ira D. Perry, Muskegon, Mich.

Application September 14, 1935, Serial No. 40,593

3 Claims. (Cl. 152—12)

This invention relates to improvements in air valves particularly intended for use in connection with inflated articles such as automobile tires, foot-balls, basket-balls and any such articles as require inflation, but it will appear that the features of the invention are not limited to these or any other particular classes of service and devices, except as I may do so in the claims.

One object of the invention is to provide a valve arrangement in which there is only one place that requires sealing against the passage of air; thereby lessening the chances of leakage by at least one-half.

Another object of the invention is to provide a valve that can be manufactured much cheaper than those now on the market.

Another object of the invention is to provide a valve arrangement that can be assembled easily without any chance of the parts being assembled wrongly.

Another object of the invention is to provide a valve arrangement that will provide for the pressure of the air in the inflated article to close the valve against the passage of air from the inflated article.

Another object of the invention is to provide a valve arrangement whereby the whole valve can be assembled from the inner end of the valve thereby making the valve fool-proof.

Other objects and uses of the invention will appear from a detailed description of the same, which consists in the features of construction and combinations of parts hereinafter described and claimed.

In the drawing:

Fig. 1 is a longitudinal sectional view of my improved valve and valve stem assembly, and Fig. 2 is an enlarged fragmentary sectional view of a slightly modified form of the valve assembly shown in Fig. 1.

In referring to the drawing hereafter like parts will be numbered with like numbers. Referring first to Fig. 1 the main body portion 1 of the valve is made from a rubber composition and is provided with a flange portion 2. The bottom or inner end of the valve body is provided with a V-shaped groove for the attaching of the valve to the inner-tube of an automobile tire and is subject matter of my patent application Serial No. 743,103. In the inner end of the valve body there is cored an air passage which extends throughout the entire length of the valve body and in the drawing is shown to be of two different sizes as at 3 and 4. In the outer end of the valve there is moulded a metal insert such insert being of the proper size to enter the standard air chuck to trip the same so that air will flow therefrom into the article to be inflated and is of the ordinary kind now used in rubber stem valves, and is shown at 5 in each of the figures. The inner end of the metal insert 5 is formed with projecting rings 6 in order to make more surface for the rubber to adhere to. Through the entire length of the metal insert 5 there is a passage 8 for air that is of the same diameter as the cored rubber hole that it matches and coincides with. The cored hole 4 at its outer end is decreased in size and forms a V-shaped groove as at 7. The inner part of this V-shaped groove is slanted downward until it meets the cored hole 3. The cored hole 3 and the hole 8 in the insert are of the same size and the two form a guide for the stem 9 of the valve 10 to slide up and down through. The lower part 11 of the stem 9 is enlarged so as to fit, with a sliding fit, the cored hole 3 thereby forming a guide to exactly register the sharp edge 12 of the valve 10 with the apex of the angle of the neck 13 which is formed by the intersection of the sides 14 and 15 of the cored hole 4. The upper edge of the valve 10 is brought to a sharp knife edge as shown at 12 so that when the sharp edge 12 is forced against the apex of the angle of the neck 13 a positive air tight seal is produced thereby shutting off all air from either passing in or out of the inflated article. The bottom part of the cored hole 4 is enlarged so as to receive the enlarged head of the plug 17. The upper end of the plug 17 is tapered to a flat end as shown at 18 and has a cored hole 19 through it so that the air pressure of the inflated article is at once exerted against the valve 10 to force it tightly up against the apex of the angle of the neck 13 and thereby immediately closing and sealing the air passage 3 and stopping all passage of air through said passage 3. The tapered part 20 of the plug 17 is made long enough to fit against the underside 21 of the valve 10 in a compressed condition when the valve 10 is closed thereby always exerting a sufficient upward pressure on valve 10 to keep the passage 3 completely closed against the passage of air when the valve 10 is normally closed. When the inflatable article is to be inflated with more air or when air is to be first put into it the valve 10 is pushed open in the ordinary way now in use and the air then passes down around the valve stem 9. The enlarged portion 11 of the stem 9 having been pushed down far enough to allow the air to pass through and past the valve 10 into the chamber 23. From there the air goes through the holes 24 into the chamber 25 and on through the passage 26 into the article to be inflated. When inflation is taking place the tapered end 20 is compressed enough to allow the valve 10 to open but the resiliency of the rubber plug 17 keeps a steady upward push against the valve 10 so that when the air supply nozzle is taken from the valve stem 9 the valve 10 immediately goes to its seat and thereby closes the air passage and prevents the escape of any air.

Fig. 2 shows another form of valve in which, like Fig. 1, there are two air seals. The apex 31 of the angle 32 is exactly in line with the edge 33 of the ring 16 so that when the valve is closed the apex 31 fits the edge 33 and forms an air tight joint. The annular neck 34 is formed with a tapered side 35 and has a smaller angle, measured from a central line through the axis of the valve, than the side 36 of the valve 10. The annular neck 34 has a flat surface 37 which is larger than the flat surface 38 of the valve 10. When the valve 10 seats itself the annular neck 34 is squeezed up and into the space 39 of the valve 10 and thereby forms another air tight seal. The rest of the valve construction is the same as in Fig. 1.

The metal insert 5 has no function to perform except to open the air chuck of the inflating nozzle and could be dispensed with except for that one purpose.

While I have herein shown and described only certain valve constructions and embodiments of the features of my present invention, still I do not intend thereby to limit myself, except as I may do so in the claims.

I claim:—

1. A tire valve or the like including an elongated stem of one piece yieldable material, said stem having a longitudinally extending passageway therethrough, the inner portion of which is of materially greater diameter than the outer portion, an inwardly facing valve seat of substantially V-shaped cross-section formed in the material of the stem at the upper end of the inner enlarged passageway and surrounding the inner end of the outer passageway at the juncture of said portions, a plunger extending freely through the outer passageway portion and into the enlarged inner passageway, a valve head carried on the inner end of said plunger and having an outwardly facing annularly tapered rim adapted to fit and seat within the inwardly facing valve seat in the material of the stem and compress the material of the stem outwardly and radially against the valve plunger under pressure of the air in said inner enlarged passageway.

2. A tire valve or the like including an elongated stem of one piece yieldable material, said stem having a longitudinally extending passageway therethrough, the inner portion of which is of materially greater diameter than the outer portion, an inwardly facing valve seat of substantially V-shaped cross-section formed in the material of the stem at the upper end of the inner enlarged passageway and surrounding the inner end of the outer passageway at the juncture of said portions, a plunger extending freely through the outer passageway portion and into the enlarged inner passageway, a valve head carried on the inner end of said plunger and having an outwardly facing annularly tapered rim adapted to fit and seat within the inwardly facing valve seat in the material of the stem, a hollow plug of yieldable material carried within said enlarged inner passageway and having bearing against the inner face of said valve head, the interior of said plug being in constant communication with the inner end portion of said enlarged passageway, whereby the material of the stem surrounding the outer passageway is compressed outwardly and radially against the valve plunger under pressure of air within said plug and inner enlarged passageway.

3. A tire valve or the like comprising an elongated stem of yieldable material, said stem having an outer longitudinally extending passageway which communicates with an inner passageway portion of materially greater diameter, a recessed inwardly facing valve seat formed in the material of the stem at the upper end of said enlarged passageway and providing a yieldable inwardly extending neck portion surrounding the inner end of the outer passageway, a plunger adapted to extend freely through said outer passageway and through said neck portion and into the enlarged inner passageway, and a valve head carried at the inner end of said plunger and having an outwardly facing annularly tapered rim adapted to seat within said inwardly facing valve seat and receive and radially compress the material of the neck portion against the sides of said plunger under pressure of the air in said enlarged passageway.

IRA D. PERRY.